(12) United States Patent
Edgar

(10) Patent No.: US 8,649,524 B2
(45) Date of Patent: Feb. 11, 2014

(54) METHOD AND APPARATUS FOR USING HAPTICS FOR FITTING HEARING AIDS

(75) Inventor: Dan Edgar, Lakeville, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 945 days.

(21) Appl. No.: 12/540,976

(22) Filed: Aug. 13, 2009

(65) Prior Publication Data

US 2011/0038498 A1 Feb. 17, 2011

(51) Int. Cl.
*H04R 29/00* (2006.01)
*H04R 25/00* (2006.01)

(52) U.S. Cl.
USPC ............................................ 381/60; 381/312

(58) Field of Classification Search
USPC ................... 381/312, 60, 314, 315, 320, 321; 600/559
See application file for complete search history.

(56) References Cited

U.S. PATENT DOCUMENTS

| | | | |
|---|---|---|---|
| 7,978,181 B2 * | 7/2011 | Westerman | 345/173 |
| 2004/0071296 A1 * | 4/2004 | Wasden | 381/60 |
| 2004/0071304 A1 * | 4/2004 | Yanz et al. | 381/312 |
| 2004/0234089 A1 * | 11/2004 | Rembrand et al. | 381/312 |
| 2006/0098831 A1 * | 5/2006 | Kaiser et al. | 381/312 |
| 2007/0247429 A1 | 10/2007 | Westerman | |
| 2008/0309632 A1 * | 12/2008 | Westerman et al. | 345/173 |
| 2010/0235747 A1 * | 9/2010 | Young | 715/727 |

FOREIGN PATENT DOCUMENTS

WO    WO-2008025858 A2    3/2008

OTHER PUBLICATIONS

"European Application Serial No. 10251441.1, Response filed Jul. 11, 2012 to Office Action mailed Jan. 11, 2012", 2 pgs.
"European Application Serial No. 10251441.1; Search Report mailed Nov. 18, 2010", 5 pgs.
"Welcome to the KUT BioRobotics Lab", Korea University of Technology, [Online] Retrieved from the Internet: <URL: http://robot.kut.ac.kr/>, (Accessed Aug. 15, 2013), 1 pg.
"What is Haptics?", Immersion Corporate Overview, [Online]. Retrieved from the Internet: <URL: http://web.archive.org/web/20090202035447/http://immersion.com/corporate/press_room/what_is_haptics.php>, (Archived Feb. 2, 2009), 1 pg.
Park, Will, "Apple patent filed for tactile touchscreen—raised, indented keys", [Online]. Retrieved from the Internet: <URL: http://www.intomobile.com/2007/10/25/apple-patent-filed-for-tactile-touchscreen-raised-indented-keys/>, (Oct. 25, 2007), 2 pgs.
Vanderheiden, Gregg C, "Use of audio-haptic interface techniques to allow nonvisual access to touchscreen appliances", [Online]. Retrieved from the Internet: <URL: http://trace.wisc.edu/docs/touchscreen/chi_conf.htm>, (Accessed Aug. 15, 2013), 9 pgs.

* cited by examiner

*Primary Examiner* — Curtis Kuntz
*Assistant Examiner* — Sunita Joshi
(74) *Attorney, Agent, or Firm* — Schwegman Lundberg & Woessner, P.A.

(57) ABSTRACT

The present subject matter relates generally to the method and apparatus for using haptics for fitting hearing aids. The application of haptics technology to hearing aid fitting system software is provided. A graphical user interface with a touch screen for hearing aid fitting provides tactile response to a user adjusting hearing aid parameters using the touch screen. The interface provides feedback to assist the user in rapid and accurate hearing aid fitting. Other variations include using a touch pad for the tactile response.

20 Claims, 1 Drawing Sheet

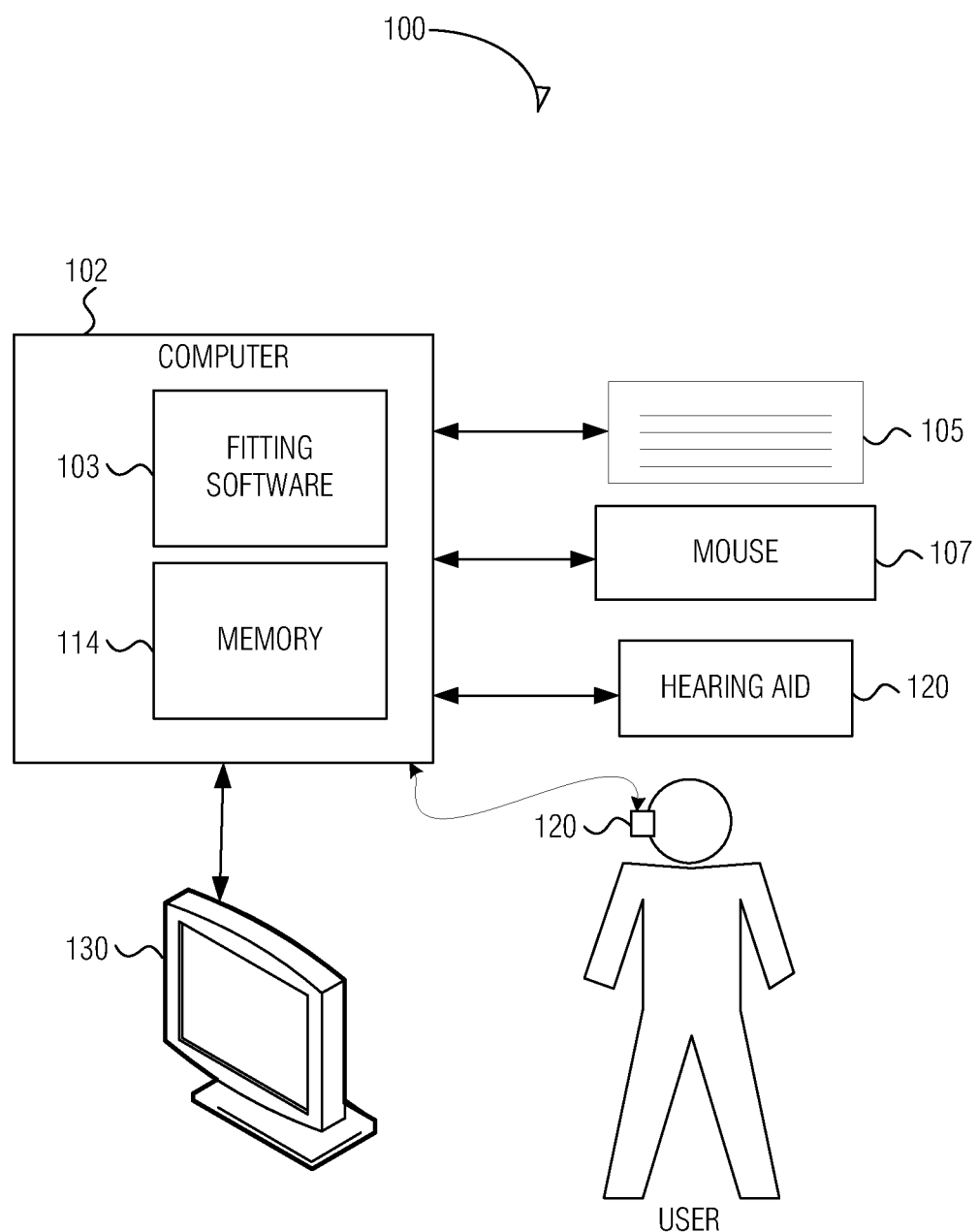

METHOD AND APPARATUS FOR USING HAPTICS FOR FITTING HEARING AIDS

FIELD OF THE INVENTION

The present subject matter relates generally to fitting hearing aids, and in particular to method and apparatus for using haptics for fitting hearing aids.

BACKGROUND

Wearers of hearing aids undergo a process called "fitting" to adjust the hearing aid to their particular hearing and use. In such fitting sessions the wearer may select one setting over another, much like selecting one setting over another in an eye test. Other types of selections include changes in level, which can be a preferred level. A challenge in fitting is to adjust several controls at the same time using the fitting software. It can be difficult to make adjustments without violating setting limits and preferred ranges. It can also be difficult for a clinician or audiologist to monitor limits that are changing as parameters in the device are being modified.

Thus, there is a need in the art for an improved interface for performing hearing aid fitting.

SUMMARY

Disclosed herein, among other things, are methods and apparatus for using haptics for fitting hearing aids. The present subject matter provides for the application of haptics technology to hearing aid fitting system software. A graphical user interface with a touch screen for hearing aid fitting provides tactile response to a user adjusting hearing aid parameters using the touch screen. The interface provides feedback to assist the user in rapid and accurate hearing aid fitting. Other variations include using a touch pad for the tactile response.

This Summary is an overview of some of the teachings of the present application and not intended to be an exclusive or exhaustive treatment of the present subject matter. Further details about the present subject matter are found in the detailed description and appended claims. The scope of the present invention is defined by the appended claims and their legal equivalents.

BRIEF DESCRIPTION OF THE DRAWINGS

FIG. 1 shows a fitting system including haptics technology according to various embodiments of the present subject matter.

DETAILED DESCRIPTION

The following detailed description of the present subject matter refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various" embodiments in this disclosure are not necessarily to the same embodiment, and such references contemplate more than one embodiment. The following detailed description is demonstrative and not to be taken in a limiting sense. The scope of the present subject matter is defined by the appended claims, along with the full scope of legal equivalents to which such claims are entitled.

The present subject matter of the invention relates generally to method and apparatus for using haptics when fitting hearing aids. A hearing aid fitting system is typically controlled via standard mouse and keyboard input. The present subject matter further includes a graphical user interface providing for a touch screen with haptic tactile response.

Haptics is a technology that allows touch screens to provide real tactile feedback. The sensations of pressure, stretching, and motion can all be simulated on a touch screen via haptics. For example, typing on a keyboard has the touch response of a key press. Haptics allows that touch response to be simulated on a touch screen.

FIG. 1 shows a fitting system with haptics technology according to various embodiments of the present subject matter. Computer 102 is adapted to execute fitting software 103 that takes typical inputs from devices such as keyboard 105 and mouse 107 for fitting one or more hearing aids 120. The present subject matter takes inputs from a touch screen 130, in various embodiments. A touch pad may be used to provide the tactile response in various embodiments. It is understood that the user may be the wearer of one or more hearing aids or can be a clinician, audiologist or other attendant assisting with the use of the fitting system 100. The system 100 includes memory 114 which stores and displays on display 130 one or more user selections for the fitting system. It is understood that the configuration shown in FIG. 1 is demonstrative and is not intended in an exhaustive or exclusive sense. Other configurations may exist without departing from the scope of the present subject matter. For example, it is possible that the memory 114 may be encoded in firmware, software, or combinations thereof. It is possible that the system may omit a mouse or a keyboard or may include additional input/output devices without departing from the scope of the present subject matter. Other variations are possible without departing from the present subject matter.

The present subject matter provides for the application of haptics technology to hearing aid fitting system software. A graphical user interface for hearing aid fitting provides tactile response to a user adjusting hearing aid parameters. For example, the upper and lower range of the adjustment haptics technology can provide the sensation of running your finger into a solid object, and a sensation of greater or lesser drag and/or texture can be simulated as the user nears the solid range end points. In addition, a "light pressure click" is provided as the user drags the adjustment value through a step or gradation in adjustment. Further examples of the haptic interface are provided herein. The interface provides feedback to assist the user in rapid and accurate hearing aid fitting.

Graphical/Touch Adjustments

In one embodiment, a touch screen is provided with a graphical adjustment set of hearing aid operating and fitting software (such as the Starkey Inspire OS). The user touches the graphical adjustment and starts to move the adjustment up and down. As the user hits the upper and lower range of the adjustment, haptics technology can provide the sensation of running the user's finger into a solid object. During the graphical/touch adjustment, a sensation of greater or lesser drag and/or texture can be simulated via haptics before solid object haptic response is sent at minimum and maximum extent, in various embodiments. This allows a user to understand the extent and available gain of a graphical/touch adjustment via a haptics touch response.

In various embodiments, certain hearing aid parameter adjustments have a total number of steps that can be increased or decreased. In one embodiment, the steps correspond to a predefined parameter increment. As the steps are increased or decreased, a haptics response induces a "light pressure click"

as the user drags the adjustment value through a step. This provides feedback to the user regarding the amount of adjustment.

Faceplate Haptics Simulation

Various hearing aids include controls on the surface of the hearing aid housing, or faceplate. Examples include a push button for memory switching, and a dial for volume control on the faceplate. The present subject matter provides touch screen graphic adjustments within the software for faceplate adjustments, to fully simulate the textures and pressure of the faceplate on a touch screen.

Use of haptics technology in this manner assists in education of hearing aid wearers. For example, the user can determine how far the volume control dials spin through the volume control range, as well as receiving immediate feedback on how they can expect the faceplate control of a hearing aid to respond, without the hearing aid being present. This embodiment also allows non-hearing aid wearers and audiologists to get a more realistic feel for the devices that they provide.

Light Switch Touch Response for "On/Off" Controls

The touch, pressure, and other aspects of standard on/off light switches in a home can be emulated via haptics technology, according to various embodiments of the present subject matter.

In hearing aid fitting system software, many features are turned on and off. According to various embodiments, the touch versions of these adjustment controls have the same pressure and touch characteristics as standard light switch controls. This assists the user in determining the "on/off" state of the hearing aid adjustment.

Touch Compression Adjustments

Visualizing compression ratio for a hearing aid has been a continued problem within fitting systems. The present subject matter utilizes haptics technology to induce a pressure response to demonstrate the amount of compression, according to various embodiments. According to one embodiment, a pinch gesture can be used to increase and decrease compression in a hearing aid channel. During the pinch, a pressure response can be broadcast to the fingers doing the pinch with a low pressure when compression is low (1.0) and a higher pressure when compression is high (3.0+). In this embodiment, pressure on the touch screen is used to model compression of the hearing aid and make compression more understood to fitting system users.

Pulsed Responses

Various hearing aid fitting software systems (such as Inspire OS) have a Best Fit feature that can provide a best fit for one memory, for all memories, the response of one memory, or the response of all memories. According to various embodiments, the present subject matter includes a touch screen for providing tactile feedback as to what was changed when the Best Fit feature is implemented. In one embodiment, if four memories are modified, then four pulses can be sent to the touch interface to provide an indication to the user.

The number of pulses sent to the touch interface can correspond to a number of parameters changed, or provide a count of parameter value, in various embodiments. Those of skill in the art will appreciate that other examples of corresponding values to a number of pulsed responses can be used without departing from the scope of this disclosure.

Touch to Indicate Differences in Response Values

According to various embodiments, if a user wishes to get a "touch" version of the specific response difference values (i.e. gain, compression) between right ear and left ear, the user can place his hands on the right and left touch responsive hearing aid graphs and get different pressure levels sent to their fingers to indicate differences for the response values.

For example, if the gain in channel 0 is high on the right, but low on the channel 0 on the left side, the present subject matter can apply a greater pressure response to the right touch than the left touch in proportion to the gain difference. If multiple fingers are placed across the different channel ranges on the response graph, then different pressure responses will register with each finger across the channel ranges. This touch differential would allow a touch based evaluation of gain, compression, or other per channel variables, according to various embodiments.

Touch Based Audiograms and Audibility Modeling

According to various embodiments, a touch-based audiogram graph can use feedback to let a user know when they are passing over certain frequencies. In one embodiment, pressure response is incrementally increased as a user drags their finger across the audiogram at 0.5 kHz, 1 kHz, 2 kHz and 4 kHz. For example, light pressure feedback is provided at 0.5 kHz and the pressure is increased as the frequency increases.

According to various embodiments, to represent the severity of hearing loss, finger pressure feedback on the touch screen is increased at the level (in dB, for example) recorded hearing loss increases. For example, at 0 dB no pressure on the touch response would be registered.

Further uses of haptics for fitting hearing aids and entering hearing aid clinical data are within the scope of the present subject matter. As described, applying a haptics response to touch based fitting system interfaces has many clinically meaningful uses.

In various embodiments, a network connection is used to transmit or receive information for the tactile response for fitting. In various embodiments, the INTERNET is used to communicate information for the tactile response for fitting. In various embodiments a wireless connection is used to communicate information for the tactile response.

In various embodiments a touch pad disassociated from a touch screen, much like a touch pad on a laptop, is also a source for all of the haptic techniques described in this application.

The present subject matter is demonstrated in the fitting of hearing aids, including but not limited to, behind-the-ear (BTE), in-the-ear (ITE), in-the-canal (ITC), or completely-in-the-canal (CIC) type hearing aids. It is understood that behind-the-ear type hearing aids may include devices that reside substantially behind the ear or over the ear. Such devices may include hearing aids with receivers associated with the electronics portion of the behind-the-ear device, or hearing aids of the type having receivers in the ear canal of the user. The present subject matter can also be used in hearing assistance devices generally, such as cochlear implant type hearing devices. It is understood that other hearing assistance devices not expressly stated herein may be used in conjunction with the present subject matter.

This application is intended to cover adaptations or variations of the present subject matter. It is to be understood that the above description is intended to be illustrative, and not restrictive. The scope of the present subject matter should be determined with reference to the appended claims, along with the full scope of legal equivalents to which such claims are entitled.

What is claimed is:

1. A method for fitting a hearing aid worn by a wearer with a fitting system, comprising:
    programming an interface to the fitting system adapted to provide a tactile response to a user of the system during a fitting session; and providing the tactile response including using haptics to provide a mechanical feedback sensation to the user when the user touches a portion of the interface during the fitting session.

2. The method of claim 1, wherein programming an interface includes programming a touch screen interface.

3. The method of claim 1, wherein providing a tactile response includes providing a sensation of a user's finger against a solid object as an indication of an upper or lower limit on a range of parameter adjustment.

4. The method of claim 1, wherein providing a tactile response includes providing a sensation of greater or lesser drag against a user's finger as an indication of approaching an upper or lower limit on range of parameter adjustment.

5. The method of claim 1, wherein providing a tactile response includes providing a sensation of light pressure clicks as an indication of an increase or decrease of a predefined increment of parameter adjustment.

6. The method of claim 1, wherein providing a tactile response includes providing a sensation to simulate texture and pressure of controls on a faceplate of the hearing aid.

7. The method of claim 1, wherein providing a tactile response includes providing a sensation to simulate pressure and touch characteristics of a wall mounted on/off light switch for user reference to on/off status of the hearing aid.

8. The method of claim 1, wherein providing a tactile response includes providing a sensation of pinching, wherein a pressure level of pinching is scaled to hearing aid compression ratio such that an increased pressure level corresponds to an increased compression ratio.

9. The method of claim 1, wherein providing a tactile response includes providing a first sensation to a user's right hand and a second sensation to a user's left hand, wherein the first sensation corresponds to a response value for a hearing aid adapted for a right ear and the second sensation corresponds to a response value for a hearing aid adapted for a left ear, to indicate differences in response values for a right and left hearing aid.

10. The method of claim 1, wherein programming an interface includes programming a touch pad interface.

11. A fitting system for fitting a hearing aid, the fitting system executing on a computer, the system comprising:
 an interactive touch screen for entries of one or more user preferences by a user of the fitting system during a fitting session, the touch screen adapted to provide a tactile response to the user during the fitting session, wherein providing the tactile response includes using haptics to provide a mechanical feedback sensation to the user when the user touches a portion of the interactive touch screen; and
 memory to store the one or more user preferences,
 wherein the computer is adapted to control the touch screen to provide the tactile response, and further adapted to store the one or more user preferences.

12. The system of claim 11, wherein the tactile response includes a number of pulses sent to the touch screen to indicate a corresponding number of modified parameters.

13. The system of claim 12, wherein the number modified parameters include a number of modified memory locations.

14. The system of claim 11, wherein the tactile response includes multiple pressure responses for accommodating multiple user fingers touching the screen.

15. The system of claim 14, wherein the multiple pressure responses correspond to different channels of the hearing aid.

16. The system of claim 11, wherein the tactile response includes incrementally increasing pressure responses as the user drags a finger across an audiogram displayed on the screen from a first frequency to a higher frequency on the audiogram.

17. The system of claim 16, wherein the pressure response increases incrementally on the audiogram at 0.5 kHz, 1 kHz, 2 kHz and 4 kHz.

18. The system of claim 11, further comprising a network connection for transmitting or receiving the tactile response.

19. The system of claim 18, wherein the network connection includes an INTERNET connection.

20. The system of claim 11, wherein the computer communicates wirelessly with the hearing aid.

* * * * *